2,739,442

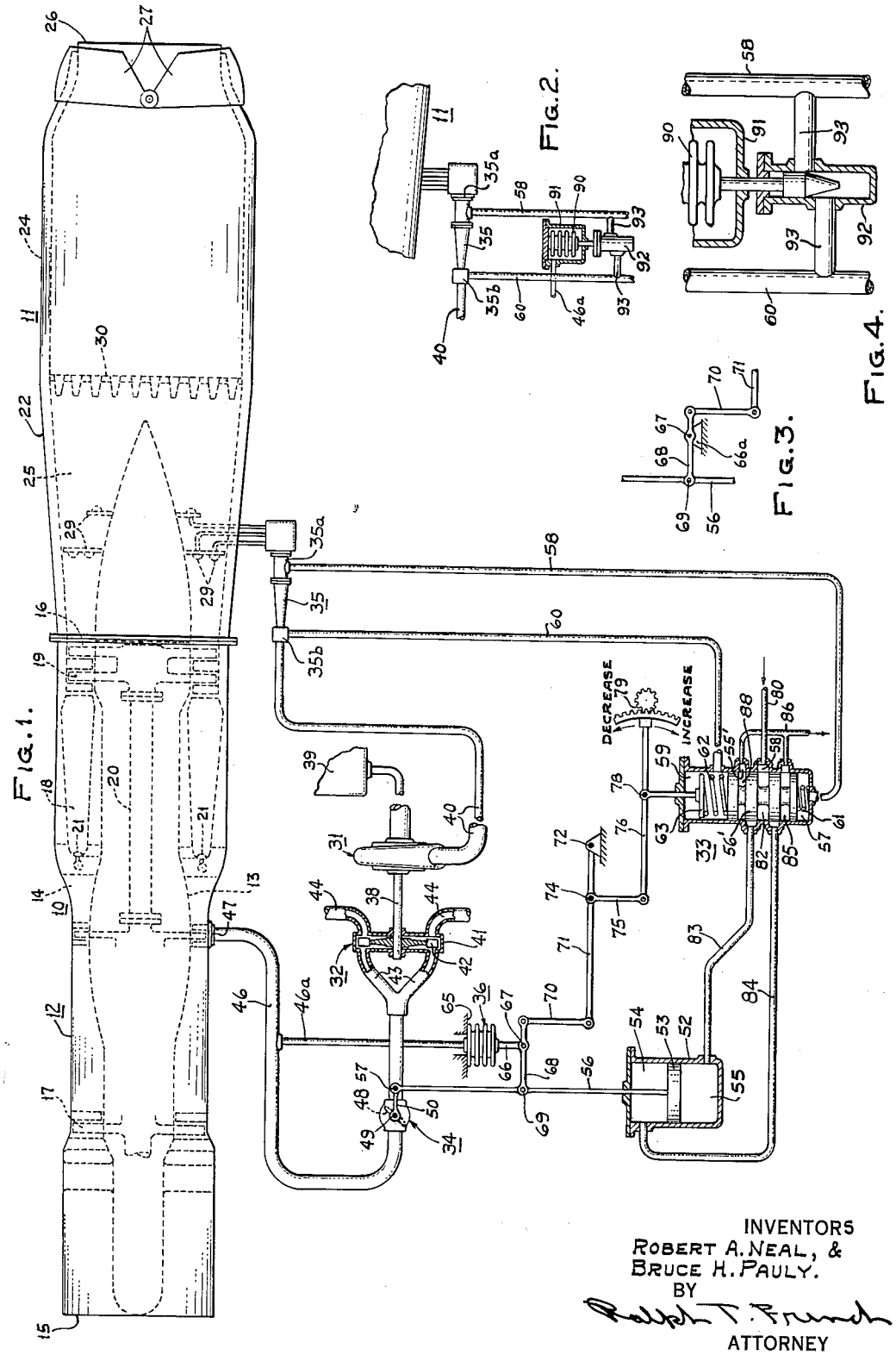
March 27, 1956
R. A. NEAL ET AL
FUEL CONTROL SYSTEM FOR AFTERBURNER
OF TURBOJET POWER PLANT
Filed Oct. 13, 1950
2,739,442
INVENTORS
ROBERT A. NEAL, &
BRUCE H. PAULY.
BY
ATTORNEY 2,739,442
Patented Mar. 27, 1956

FUEL CONTROL SYSTEM FOR AFTERBURNER OF TURBOJET POWER PLANT

Robert A. Neal, Media, and Bruce H. Pauly, Holmes, Pa., assignors to Westinghouse Electric Corporation, East Pittsburgh, Pa., a corporation of Pennsylvania Application October 13, 1950, Serial No. 189,962

1 Claim. (Cl. 60—35.6)

This invention relates to gas turbine power plants, and more particularly to an aviation turbojet power plant of the class equipped with an afterburner or tailburner.

It has been proposed to effect supply of fuel to an afterburner associated with a jet engine, independently of the metering of fuel to the usual main combustion apparatus, by means of an engine-driven fuel pump of the positive displacement type, together with a by-pass control for returning excess fuel to the fuel system at the inlet side of the pump. With such a system, fuel must be continuously pumped even while the afterburner is inoperative, and in circulating through the pump and by-pass communications may become sufficiently heated to cause undesirable effusion of air and vapor. It is an object of the present invention to provide improved fuel metering apparatus for an afterburner which will effect the supply of only the fuel required to operate the afterburner, without necessitating the circulation of unused fuel through a by-pass communication during inoperative intervals of time.

Another object of the present invention is the provision of improved fuel supply apparatus for the afterburner of a jet power plant in which an air turbine driven by air under pressure supplied from the compressor of the power plant is utilized for driving a fuel pump to deliver fuel to the afterburner, together with valve means for controlling the supply of motive air to the air turbine or throttling fuel discharged from the pump in accordance with fuel demand as measured by the total pressure at the turbojet compressor discharge outlet.

A further object of the invention is the provision of means for controlling the supply of fuel by a fuel pump to an afterburner, which means is automatically operative to stop the fuel pump for avoiding undesired circulation and consequent heating of fuel when operation of the afterburner is not required.

These and other objects are effected by the invention as will be apparent from the following description and claim taken in connection with the accompanying drawing, forming a part of this application, in which:

Fig. 1 is a diagrammatic illustration of a typical aviation gas turbine engine having an afterburner, and equipped with fuel control apparatus constructed in accordance with a preferred form of the invention;

Fig. 2 is a fragmentary diagrammatic view of a portion of a similar fuel control apparatus including control means embodying the invention in a different form;

Fig. 3 is a fragmentary diagrammatic view of a portion of the linkage mechanism modified for use with the apparatus shown in Fig. 2; and Fig. 4 is an enlarged detail diagrammatic sectional view of the valve shown in Fig. 2.

Referring to Fig. 1 of the drawing, the gas turbine power plant shown therein comprises a turbojet engine 10 and a tailburner apparatus 11, both of which have substantially cylindrical casing structures mounted in co-axial alignment and adapted to be supported in the fuselage or wing of an aircraft (not shown). The turbojet engine 10 includes an outer casing 12 and an inner core structure generally indicated at 13, which form an annular passageway 14 extending longitudinally through the engine from a forwardly-directed air intake opening 15 to a rearwardly disposed turbine discharge passage 16. Operating elements of the turbojet engine are mounted in axial alignment to minimize frontal area, and include an axial-flow compressor 17, annular combustion apparatus 18, and a turbine 19, the rotor of which is operatively connected to the rotor of the compressor through the medium of a common shaft 20 that is suitably journaled within the core structure 13. In operation, air entering the intake opening 15 is compressed by the compressor 17 and delivered to the combustion apparatus 18, where fuel supplied by nozzles 21 is burned to form hot motive fluid, which is expanded through the turbine 19 for driving the compressor, and thence supplied through the discharge passage 16 to the afterburner apparatus 11.

The afterburner apparatus 11 comprises a generally cylindrical outer casing 22, the forward end of which is secured to the rearmost section of the turbojet outer casing structure 12. Mounted in the casing 22 is a tubular casing section 24, in which is formed an auxiliary combustion chamber 25, which communicates with the turbine discharge passage 16 and terminates in a discharge opening or nozzle 26, the flow area of which may be controlled by suitable movable tail-piece members 27. Auxiliary fuel nozzle apparatus 29, which may include nozzles of the fixed flow area type, is mounted in the casing section 24 for supplying fuel to the combustion chamber 25. A suitable flameholder or apertured baffle 30 may also be mounted in the chamber 25 downstream of the nozzle apparatus 29. It will be understood that, when operation of the afterburner is desired, fuel supplied by way of the nozzle apparatus 29 is burned in the heated gas and air mixture exhausted from the turbojet unit 10 to provide further energy which is expended upon final discharge of the resultant motive fluid to atmosphere through the variable nozzle 26, to propel the aircraft.

According to the invention, fuel is supplied to the afterburner 11 under control of apparatus comprising a centrifugal fuel pump 31, an air turbine 32 operatively connected thereto, servo-mechanism including a relay valve device 33, an air supply valve device 34 actuated by the servo-mechanism, a fuel flow measuring device or venturi 35, and a pressure-responsive device or bellows diaphragm 36. The fuel pump 31 may be of any suitable construction, and is operated by a rotary drive shaft 38 to effect supply of fuel under pressure from a source, such as a reservoir 39, through a pipe 40 to the inlet of the venturi 35, the outlet of which is connected through suitable communications to the nozzles 29 of the afterburner 11.

The air turbine 32 is provided for driving the fuel pump 31 through the medium of the shaft 38, and comprises an annular casing 41 having mounted therein a turbine wheel 42 which is operatively connected to the shaft. The turbine wheel 42 is adapted to be driven by compressed air admitted by way of inlet passages 43 and discharged through atmospheric communications 44. The supply valve device 34 is adapted for automatic operation as hereinafter explained to control the supply of air to the turbine 32 by way of a conduit 46, which communicates with the compressor 12, preferably in the region of the outlet, as indicated at 47. The supply valve device 34 may be of any suitable construction, and in the illustrated form comprises a casing containing a butterfly valve element 48 pivotally mounted on a pin 49 having an operating arm 50. For operating the valve element 48 there is provided a cylinder 52 containing a piston 53, which is interposed between chambers 54 and 55, and has a piston rod 56 that is operatively connected to the arm 50 by means of a pin 57.

The relay valve device 33 comprises a casing 55' having a bore in which is slidably mounted a valve element 56', at one end face of which is formed a chamber 57' communicating through a pipe 58 with the outlet 35a of the venturi 35, and at the opposite end face of which is formed a chamber 59 communicating through a pipe 60 with the throat portion 35b of the venturi. A biasing spring 61 may be disposed in the chamber 57' for normally holding the valve element 56' in a normal or lap position, as shown in Fig. 1. An adjustable spring 62 is interposed between the opposite face of the valve element 56' and a movable spring seat element 63 for yieldably exerting a downward force on the valve during operation, as hereinafter more fully explained.

The pressure responsive device 36 may comprise a bellows diaphragm suitably mounted in a stationary bracket 65 and subject to pressure of air discharged from the compressor 17 of the power plant 10. In the diagrammatic form shown in the drawing, the interior of the bellows diaphragm or device 36 is maintained in constant communication with the conduit 46 through a conduit 46a. It will be understood that in actual practice, the bellows diaphragm will thus be sensitive to variations in compressor-discharge pressure as a measure of mass air flow through the power plant. The free end of the bellows diaphragm 36 carries a rod 66, which is pivotally connected by a pin 67 to a lever 68 intermediate the ends thereof. One end of the lever 68 is pivotally connected by a pin 69 to the piston rod 56, and the opposite end is operatively connected through the medium of a link 70 to one end of a lever 71, the other end of which is fulcrumed on a stationary pin 72. A pin 74 carried intermediate the ends of the lever 71 is pivotally connected by means of a link 75 to a lever 76, which carries an intermediate pin 78 pivotally connected to the movable spring seat 63, and is manually-adjustably fulcrumed on a rack and pinion device 79 or other suitable positioning means.

In operation, the fuel system just described effects metering of fuel to the fixed area nozzles 29 in accordance with the pressure of air delivered by the compressor 17, and consequently according to flight speed, altitude and ambient temperature as measured by the total pressure of air discharged by the compressor 17. Assuming that the manually controlled positioning means 79 is adjusted to the desired setting during flight operation, a change in prevailing conditions, such as an increase in altitude, may result in a reduction in the pressure of air delivered by the compressor 17 through the conduits 46 and 46a to the bellows diaphragm 36. The diaphragm 36 then tends to retract thereby reducing the force exerted through the medium of the levers 68, 71 and 76 on the spring 62, and permitting the pressure of fuel in the chamber 57' of the relay valve device 33 to overbalance the opposing pressure of fuel in the chamber 59 communicating with the low pressure throat portion 36b of the venturi 35. The valve element 56' is thereby shifted upwardly, as viewed in the drawing, along with the spring 62 and seat 63, while the levers 76, 71 and 68 are correspondingly tilted about their respective fulcrums 79, 72 and 69 to correspond with a new position of the rod 66. With the valve member 56' thus moved to an upper position, communication is established for the supply of fluid under pressure to the piston chamber 55 from a suitable source (not shown) by way of a supply pipe 80, a cavity 82 in the valve element, and a pipe 83, while fluid under pressure is discharged from the opposite piston chamber 54 through a pipe 84, a cavity 85 in the valve element, and a drain pipe 86. The increase in fluid pressure in the chamber 55 effects upward movement of the piston 53 and rod 56 to move the butterfly valve element 48 toward closed position, thus reducing the supply of air under pressure to the air turbine 32. The pump 31 is then operated at a lower speed, reducing the supply of fuel through the pipe 40 and venturi 35 to the nozzles 29 of the afterburner.

Upward movement of the piston rod 56 meanwhile effects follow-up operation of lever 68, link 70, lever 71, and link 75, effecting tilting of the lever 76 about fulcrum 79 and moving the seat 63 downwardly. At about the same time, upon reduction in the flow of fuel through the venturi 35, as just explained, the differential in pressure between the portions 35b and 35a thereof, and in the respective chambers 59 and 57' of the relay valve device 33, becomes less, contributing to the result that the spring 62 is rendered effective to return the valve element 56' to its lap position as shown in Fig. 1. Further supply of fluid under pressure to the piston chamber 55 is thus cut off, and the piston 53 and connected valve 48 are held in the new position.

Another change in operating conditions, such as a decrease in altitude of the plane carrying the power plant, may result in an increase in the air pressure at the compressor discharge and in the bellows diaphragm 36, which then expands to move the lever 68 clockwise about the pin 69, such movement being transmitted through the medium of the link 70, lever 71, link 75 and lever 76 to the spring seat 63 for increasing the force exerted on valve element 56' by the spring 62. With the valve element 56' thereby moved downwardly from the lap position, fluid under pressure is supplied to the piston chamber 54 through communications 80, 82 and 84, already described, while fluid is discharged from the chamber 55 by way of pipe 83, a valve passage 88, and drain pipe 86. The piston 53 is thus operated to open the valve 48 for effecting an increase in the speed of the air turbine 32, while the output of the pump 31 is increased for supplying fuel to the after burner at the desired higher rate. The resultant pressure differential produced by the venturi 35 is then impressed on the relay valve device 33 to augment the follow-up operation of elements 68, 70, 71 and 75 to effect lapping of the valve element 56' as already explained.

A different form of the invention is illustrated diagrammatically in Fig. 2, comprising an alternate means for scheduling fuel flow with changes in altitude, flight speed and temperature, as indicated by compressor total output pressure. An aneroid or bellows diaphragm 90 is disposed in a casing 91 which is subject to compressor output pressure communicated through the pipe 46a, as shown in Fig. 2. The bellows diaphragm 90 is operatively connected to a bleed control valve, preferably of the well known profiled variable orifice type and indicated generally by the reference character 92, which is interposed in a by-pass communication 93 connecting the pipes 60 and 58.

The bellows diaphragm 90 is operative to vary the pressure differential impressed on the relay valve device by flow of fuel through the venturi 35, in proportion to changes in flight conditions. If the arrangement shown in Fig. 2 is utilized, it will be understood that the other elements of the system as shown in Fig. 1 will function as already explained, with the exception of the lever 68, which may be carried on a fixed pin 67 and lug 66a, shown in Fig. 3. Upon a change in flight conditions causing an increase in compressor pressure acting on the bellows diaphragm 90, the bleed control valve 92 is actuated to increase flow of fuel through the by-pass 93, thereby reducing the pressure differential impressed by the venturi 35 on the relay valve device 33 shown in Fig. 1. The fluid pressure in chamber 59 thus rises relative to that in chamber 57' of the relay valve device 33, and valve element 56' moves downwardly to effect supply of fluid under pressure to the chamber 54 above piston 53. The relay valve device is thus rendered cooperative with the piston 53 to effect opening movement of the air supply valve 48. The reverse operation of the apparatus in the event of a decrease in compressor pressure acting on the bellows diaphragm 90 will be readily understood from the foregoing.

While the invention has been shown in several forms, it will be obvious to those skilled in the art that it is not so limited, but is susceptible of various other changes and modifications without departing from the spirit thereof.

What is claimed is:

In a gas turbine power plant having a compressor, and afterburner means, the combination of a centrifugal fuel pump operative to supply fuel to said afterburner means, an auxiliary turbine for driving said pump operable by compressed air bled from said compressor by way of a supply communication, a valve controlling said communication, manual control means, fluid pressure operated means responsive to the pressure of air delivered by said compressor, venturi means responsive to the output of said fuel pump for establishing a pressure differential, and servo-mechanism responsive to the rate of fuel flow from said fuel pump and cooperative with said manual control and said fluid pressure operated means for controlling operation of said valve, said servo-mechanism including a fluid pressure responsive valve element subject to the pressure differential established by said venturi means, and leverage means yieldably connected to said valve element, said leverage means being adjustable by said manual means and operatively connected to said fluid pressure operated means.

References Cited in the file of this patent

UNITED STATES PATENTS

| | | |
|---|---|---|
| 1,510,688 | La Fon | Oct. 7, 1924 |
| 2,440,663 | Ifield | Apr. 27, 1948 |
| 2,498,939 | Bobier | Feb. 28, 1950 |
| 2,570,591 | Price | Oct. 9, 1951 |